US007777627B2

(12) United States Patent
Vogt

(10) Patent No.: US 7,777,627 B2
(45) Date of Patent: Aug. 17, 2010

(54) ITEM-LEVEL ACCESS TRACKING USING TAG WRITING EVENTS

(75) Inventor: Harald Vogt, Darmstadt (DE)

(73) Assignee: SAP AG, Walldorf (DE)

( * ) Notice: Subject to any disclaimer, the term of this patent is extended or adjusted under 35 U.S.C. 154(b) by 570 days.

(21) Appl. No.: 11/698,426

(22) Filed: Jan. 26, 2007

(65) Prior Publication Data

US 2008/0180252 A1 Jul. 31, 2008

(51) Int. Cl.
*G08B 13/14* (2006.01)
*G08B 1/08* (2006.01)
*G08B 13/08* (2006.01)
*G08B 17/00* (2006.01)

(52) U.S. Cl. ............ 340/572.1; 340/572.4; 340/539.26; 340/539.13; 340/572.8; 340/545.6; 340/585

(58) Field of Classification Search ................ 340/572.4
See application file for complete search history.

(56) References Cited

U.S. PATENT DOCUMENTS

| 5,898,370 | A |  | 4/1999 | Reymond |  |
|---|---|---|---|---|---|
| 7,002,472 | B2 |  | 2/2006 | Stratmoen et al. |  |
| 7,009,517 | B2 | * | 3/2006 | Wood | 340/572.1 |
| 7,012,529 | B2 | * | 3/2006 | Sajkowsky | 340/572.1 |
| 7,098,784 | B2 | * | 8/2006 | Easley et al. | 340/539.13 |
| 7,183,920 | B2 | * | 2/2007 | Napolitano | 340/572.1 |
| 7,239,238 | B2 | * | 7/2007 | Tester et al. | 340/539.31 |
| 2002/0188259 | A1 |  | 12/2002 | Hickle et al. |  |
| 2005/0062603 | A1 |  | 3/2005 | Fuerst et al. |  |
| 2006/0261946 | A1 | * | 11/2006 | Himberger et al. | 340/572.1 |
| 2007/0013519 | A1 |  | 1/2007 | Chung et al. |  |
| 2007/0156281 | A1 | * | 7/2007 | Leung et al. | 700/225 |

FOREIGN PATENT DOCUMENTS

| WO | 2005024745 A2 | 3/2005 |
|---|---|---|
| WO | 2006004484 A1 | 1/2006 |

OTHER PUBLICATIONS

"Latest Developments in Policies on RFID Tags", Information Economy Division, Ministry of Economy, Trade and Industry, (Jan. 2006).
"Signed, Sealed, and Delivered", SAP Info, Collaborative Research in Mobile Business, (Mar. 27, 2005).
"Supply Chain Applications of RFID—Freight Containers", International Organization for Standardization (ISO), (May 16, 2004).
Balog, Adelina , et al., "Riding the Wave on Ship Container Seal and Tracking Systems", (Jun. 3, 2005).

* cited by examiner

*Primary Examiner*—George A Bugg
*Assistant Examiner*—Jack Wang
(74) *Attorney, Agent, or Firm*—Brake Hughes Bellermann LLP

(57) ABSTRACT

An electronic seal may be associated with a container and configured to detect an access event associated with the container, and may be further configured to output a notification of the access event in response thereto. A tag writer may be configured to receive the notification of the access event and further configured, in response, to write a data element to a write-once memory of a tag that is attached to an item within the container, the data element signifying the access event.

20 Claims, 4 Drawing Sheets

ITEM-LEVEL ACCESS TRACKING USING TAG WRITING EVENTS

TECHNICAL FIELD

This description relates to tracking the handling of items being transported in a container.

BACKGROUND

In commercial, military, and other settings, items are often transported in various types of containers. For example, a retail store may order items from a wholesaler, who may ship the items to the retail store by way of one or more warehouses, and/or crossing one or more international borders. In such contexts, various authorized parties may desire to access the items within the container. For example, during transport, the container may need to be opened and inspected by a border or customs agents, and the items may need to be repackaged, in the same or different container(s).

In these and many other settings, however, various unauthorized parties also may wish to gain access to the items within the containers. Consequently, it may be important to ensure that the items within the container are not disturbed, damaged, replaced, counterfeited, or otherwise used inappropriately by such unauthorized parties.

In this regard, it will be appreciated that examples of unauthorized access to items within such containers, and motivations for such unauthorized access, are numerous, and may vary depending on a particular setting or circumstance. For example, any of a thief, a competitor, or a terrorist may wish to gain such unauthorized access. Meanwhile, recipients of such items, such as customers, purchasers, or other users, may wish to deter or prevent such access, or, failing that, may wish at least to have knowledge that such unauthorized access has occurred. If such knowledge can be provided, then the recipient may choose to reject, inspect, or replace the item(s), or may take other appropriate, corrective action.

SUMMARY

According to one general aspect, a system may include but not be limited to an electronic seal associated with a container and configured to detect an access event associated with the container, and further configured to output a notification of the access event in response thereto. The system may further include, but not be limited to, a tag writer configured to receive the notification of the access event and further configured, in response, to write a data element to a write-once memory of a tag that is attached to an item within the container, the data element signifying the access event.

According to another general aspect, an access event associated with a container may be detected, the container containing at least one item associated with at least one tag. A failure to receive a valid authorization code in conjunction with the access event may be determined, and a breach data element that represents the access event as being unauthorized may be written to a slot of a write-once portion of a memory of the tag associated with the item within the container, based on the determination.

According to another general aspect, a system may include, but not be limited to, an access detector configured to detect an access event associated with a container, the container including a plurality of items, each item associated with a tag, access logic configured to make a determination as to whether the access event is authorized, and an interface configured to issue a command to a tag writer, based on the determination, to write a data element to a memory of at least one of the tags, the data element recording an authorization status associated with the access event.

The details of one or more implementations are set forth in the accompanying drawings and the description below. Other features will be apparent from the description and drawings, and from the claims.

DETAILED DESCRIPTION

Figure 1:
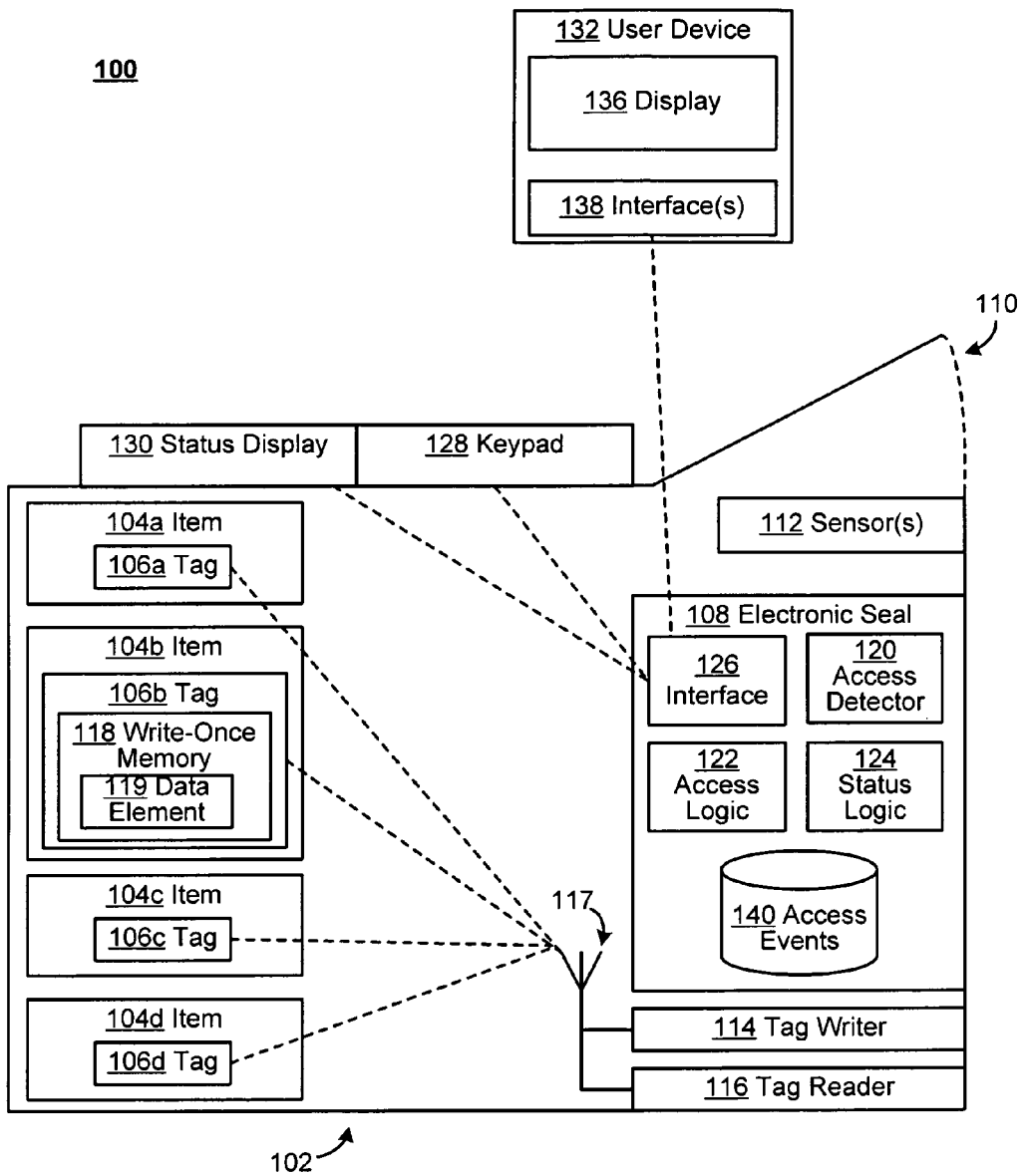
FIG. 1 is a block diagram of a system for item-level access tracking using tag writing events.

FIG. 1 is a block diagram of a system for item-level access tracking using tag writing events. In the example of FIG. 1, such item-level access tracking provides recipients with knowledge regarding whether and to what extent authorized and/or unauthorized access to a container 102 has occurred with regard to items 104a-104d contained therein. In this way, for example, the recipients may determine whether to reject, inspect, or replace one or more of the items 104a-104d, and, moreover, a security and reliability of an item transport scheme (e.g., as part of a supply chain) may be enhanced.

The container 102 may represent virtually any container that may be used to transport physical items, such as the items 104a-104d. The container 102 may include various anti-theft or anti-access techniques, some of which are described below, such as one or more locks, thick/durable walls or other surfaces, and other physical protection(s) of the container 102.

The container 102 may represent a box, a package, a carton, a packet, or any other structure that may be used to hold and enclose the items 104a-104d. Consequently, the items 104a-104d may represent virtually any physical item that may be held or enclosed, and, depending on the size of the container 102, may themselves range in size from the very small to the very large.

For example, in a commercial setting, e.g., in the supply chain examples referenced herein, the items 104a-104d may represent items or groupings of items that are to be sold, together or separately. In a manufacturing example, the items 104a-104d may represent items that are being shipped to a central location for assembly into a desired product. Meanwhile, in a military setting, the items 104a-104d may include weapons, information-gathering devices, or other militarily useful items.

In FIG. 1, the items 104a-104d are marked with corresponding tags, which also may be known, or referred to, as identifier tags, or identifiers. For example, the tags 106a-106d may include Radio Frequency Identification (RFID) tags, which, as is known, represent a range of devices that are adapted to store and transmit information, such as identification information. For example, RFID tags 106a-106d may represent passive devices, which contain some type of memory but no independent power source, and which therefore rely on a received signal to read and transmit a content of the memory. The tags 106a-106d also may represent active devices, which do contain an independent power source that may be used for various read/write operations to an associated memory. Of course, the cost, size, and other characteristics of the tags 106a-106d may vary greatly, depending on circumstance and design choice.

In normal usage, the tags 106a-106d may be used to store identification information for the corresponding, attached item(s). For example, the tag 106b may store a unique alphanumeric code identifying the item 104b (e.g., the Universal Product Code (UPC) or Electronic Product Code (EPC)). For purposes of the system of FIG. 1, however, it is not necessary that the tags 106a-106d store such identification information, and, in some example implementations as discussed herein, the tags 106a-106d may store just a single bit of information, which stores only the information that either an (unauthorized) access has occurred or not.

In order to implement such item-level access tracking techniques, and other techniques described herein, an electronic seal 108 may be used to detect or respond to access events at an access point 110. The electronic seal 108 may represent, for example, virtually any electrical device that is adaptable to receive access information from one or more (separate or integrated) sensors 112. Therefore, although not shown explicitly in the example of FIG. 1, it will be appreciated that the electronic seal 108 may include appropriate processing capabilities, memory, power source(s) (e.g., battery), and other related hardware and software resources needed to perform the functionality described herein, and related functionality. The electronic seal 108 may include actual breach prevention components (e.g., a lock for the container 102), or may work in conjunction therewith.

The sensors 112 may represent any sensing device that may be disposed to detect an access event at the access point 110. For example, where the access point 110 represents a cover, top, or lid of the container 102, the sensors 112 may represent motion detectors or contact points that is/are tripped when the, e.g., cover of the container 102 is opened, or when a lock (not shown) of the access point 110 is disturbed.

Of course, the access point 110 need not represent such a cover or lid, and may represent virtually any opening or potential opening of the container 102. For example, the access point 110 may represent a sliding or retractable door or flap. As just referenced, the container 102 also may be accessed by unauthorized parties using potential or non-designed openings, such as when the container is breached or otherwise compromised through a hinge or other component of the container 102, or when an opening is formed in or through a surface of the container 102. In these and other cases, the sensors 112 may be designed to detect such access events and to report such access events to the electronic seal 108, e.g., through a wired or wireless connection.

The access event, however, need not represent or provide an opening to the container 102 through which an unauthorized human party may physically access one or more of the items 104a-104d. For example, the access event may represent entry of an undesired chemical through the access point 110, in which case the sensors 112 may include sensors designed to detect such chemicals. In other cases, the sensors, 112 may detect an attempted access event that may only partially succeed, or that may not succeed at all (such as when a would-be thief attempts to breach the container 102 and fails).

Once the access event is detected by the electronic seal 108, the electronic seal 108 may report a notification of the access event to a tag writer 114. The tag writer 114 may be adapted to receive the notification and perform a write operation of one or more data elements to the tags 106a-106d, the result of which may include a recording of a data element 119 thereon, representing the access event.

As referenced above, the tag writer 114 may include an RFID tag writer, and may be used in conjunction with a tag reader 116 that is used to read information from the tags 106a-106d, where both the tag writer 114 and the tag reader 116 may use an antenna 117 to perform their respective functions. In the example of FIG. 1, the tag writer 114 and the tag reader 116 are illustrated as separate components, in order to illustrate and describe the two corresponding functionalities in various relevant contexts. However, it will be appreciated that, in practice, the tag writer/reader 114/116 may be implemented as a single component that performs both functionalities, and which nonetheless may be referred to simply as a tag reader (or tag writer).

More specifically, and as described in more detail below with regard to FIG. 2, the tag writer 114 may write the data element 119 to a write-once memory 118 of the tags 106a-106d (although only shown in FIG. 1 as contained within the tag 106b, for the sake of clarity and brevity). In the example of FIG. 1, the write-once memory 118 may represent a memory that may be written to a single time, with any subsequent write event being prevented and/or detectable (e.g., in the latter case, by causing a destruction or erasure of the content of the write-once memory 118 in a recognizable way). That is, any attempted erasure or deletion of the data element 119 from the write-once memory 118 (such as by, for example, an unauthorized party trying to mask, hide, or disguise an unauthorized access), may be prevented and/or recognizable as such.

Thus, in the example(s) of an unauthorized access event, a recipient of the container 102, or of any of the items 104a-104d, may check the write-once memory 118 to check for a record of an unauthorized access event, either by content (e.g., the data element 119 as read by the tag reader 116 or other tag reader), or by a detected destruction/erasing thereof. As described in more detail, below, authorized access events (e.g., by customs agents) also may be recorded, e.g., to the write-once memory 118 (or, as described with regard to FIG. 2, to a portion or slot thereof), or to another tag memory (not shown).

In this way, the system 100 provides a recipient of the container 102 with knowledge as to whether, how, and/or to what extent the items 104a-104d were accessed (or may have been accessed). Consequently, as referenced above, the recipient may use this access information in order to decide, whether, how, and/or to what extent the items 104a-104d will be accepted.

In practice, then, the electronic seal 108 may implement hardware and/or software that includes an access detector 120. The access detector 120, for example, may be integrated with, or in communication with, the sensors 112, and may receive a transmission therefrom indicating an access event, such as those discussed above (or others). Access logic 122 may receive this information from the access detector 120, and may be adapted to determine whether the detected access event is authorized or unauthorized (e.g., whether, as described in various examples below, an appropriate authorization code has been received). Status logic 124 may receive notification of an authorized or unauthorized access event/attempt, and may output a resulting status using an interface 126.

The interface 126 may represent one or more wired or wireless interfaces (e.g., a Bluetooth or ZigBee interface) that may communicate with access/status components that are external to the container 102, or that are externally accessible from the container 102. For example, the interface 126 may be in communication with a keypad 128 and a status display 130 that may be viewable and/or accessible from outside of the container 102.

In one example, the status logic 124 may initially display a requirement for an authorization code to access the container 102, using the display 130. In response, a user may attempt to enter such an authorization code for the container 102, using the keypad 128. The interface 126 may receive and forward the authorization code to the access logic 122, which may make a decision as to whether the authorization code is valid. For example, the access logic 122 may implement some type of known encryption or security technique, e.g., using public and/or private encryption keys, and/or using a password or other known access technique. The status logic 124 may then reflect a success or failure of the access attempt, again using the display 130.

In some implementations, the electronic seal 108 may include the keypad 128, the status display 130, and the sensors 112, where the keypad 128 and the status display 130 may be visible or accessible from outside the container 102. In other implementations, the electronic seal 108 may be implemented separately from the sensors 112, the keypad 128, the status display 130, and may be connected using a wired or wireless connection within the container 102. For example, the display 130 may include an actual liquid crystal display (LCD), or may include one or more light-emitting diodes (LEDs) used to encode status information regarding access events of the container 102 (e.g., lighting a specific number or color of LEDs in response to a received authorization code to indicate validity or invalidity thereof).

Additionally, or alternatively, the interface 126 may communicate with an external user device 132. For example, a user desiring to gain access may have a personal digital assistant (PDA) or other mobile device that may have a display 136 and one or more interfaces 138 (among various standard hardware and software components, not shown in FIG. 1). Then, the user may use the functionality of the user device 132 to enter an access code for transmission to the electronic seal 108 (e.g., to the interface 126), whereupon the access logic 122 and the status logic 124 may be used to provide an access result (e.g., by displaying "access granted" or "access denied" on the display 136).

Finally in the example of FIG. 1, although the electronic seal 108 and the tag writer 114 are configured to write data elements to the tags 106a-106d, such as the data element 119, it will be appreciated that additional recordings of the access events may be made. For example, access events 140 may be stored within the electronic seal 108, so as to provide a container-specific recording of access events and related information. Additionally, or alternatively, at each access event, a total number of items within the container 102 may be recorded, along with a timing of the access event (so that, for example, it may be deduced whether a number of items within the container has been reduced, perhaps due to theft, during one of the access events).

However, the access events 140, which may be useful in many circumstances, may not be used to provide the item-level access tracking and item-level authenticity information described with respect to the tags 106a-106d. For example, even if the items 104a-104d are removed, re-packaged, or otherwise separated from the container 102, any unauthorized access events will continue to be stored in association with the individual items 104a-104d. Thus, for example, if a retailer receives a shipment of the item 104a in the container 102, it may occur that the retailer may determine that the item 104a was included in a container that experienced an unauthorized access event, even if that container was different from the container 102 (e.g., was an earlier-used container from which the item 104a was repackaged).

Thus, as described, the system 100 provides item (e.g., product) verification, e.g., for a customer or other party in a supply chain, in a very inexpensive and durable way, and without requiring attachment of separate sensors to each of the items 104a-104d. For example, such a customer or other party may simply use the tag reader 116, or a separate tag reader, and may quickly read the write-once memory 118 to determine whether a specific tag is associated with an item which was contained, at least at one time, within an accessed or breached container (so that this item may be considered, potentially, to have been tampered with or otherwise misused).

Figure 2:
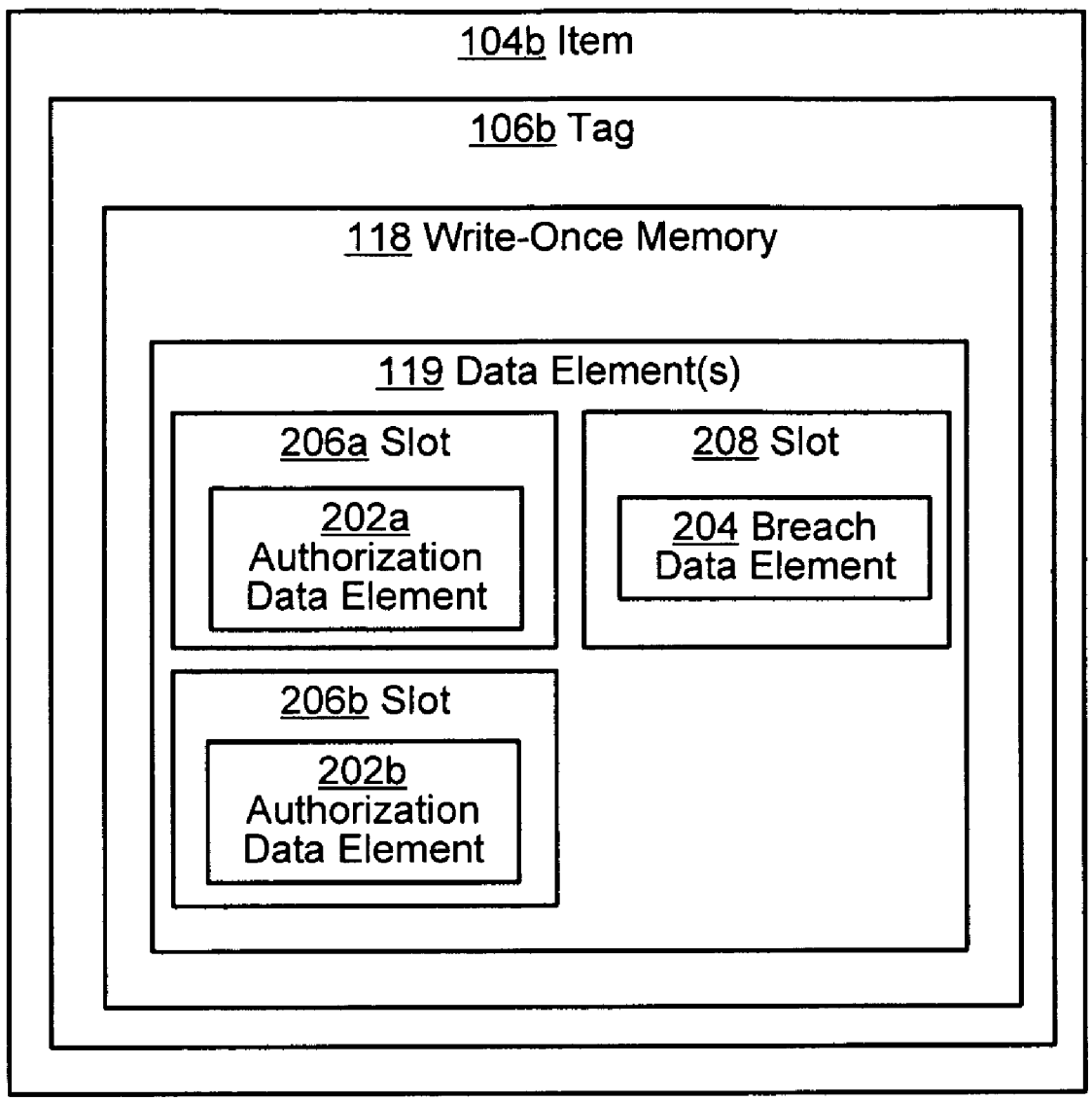
FIG. 2 is a block diagram illustrating a write-once memory that may be used in the system of FIG. 1.

FIG. 2 is a block diagram illustrating an example of the write-once memory 118 that may be used in the system of FIG. 1. As described above, the write-once memory 118 may store multiple data elements 119, so that it may occur that multiple write-once memories are used, or it may be possible that a single write-once memory is used, but is organized into different segments or portions.

For example, in FIG. 2, data elements 119 are illustrated as including authorization data elements 202a and 202b, as well as a breach data element 204, which may be stored, respectively, in slots 206a/206b and 208, as shown. Thus, in practice, and as described in more detail herein, the container 102 may be accessed multiple times during a series of shipments. Some of these accesses may be authorized, while others may be unauthorized. Each time that some access occurs, the electronic seal 108 may determine a status of the access event (e.g., using the access logic 122 and the status logic 124), and may write corresponding authorization data elements 202 or breach data elements 204, based on the determined status.

In some cases, a finite number of slots of the write-once memory 118 may be used to record an expected or predicted number of authorization data elements 202, or may be used in a desired manner to track specific types of authorization data elements 202 (e.g., access by customs agents). For example, a shipper of the container 102 may expect that only two parties may need to access the container 102 during transport thereof, and may therefore include or assign the two slots 206a, 206b. Then, during the expected access events, relevant information such as a timing or type of the access event may be written to the authorization data elements 202a, 202b in the slots 206a, 206b. Consequently, a receiving party of the item 104b may verify and have knowledge of the expected, authorized access events.

If someone attempts to write over the data in the slots 206a, 206b, e.g., to make it appear that an authorized access event did not occur, or had different characteristics (e.g., occurred at a different time), then the write-once aspect of the write-once memory 118 may prevent such a write-over, or may destroy the relevant authorization data elements 202a, 202b, the relevant slot(s) 206a, 206b, the memory 118, or the tag 106b to indicate the attempted write-over.

If a shipper or receiver of the item 104b is not concerned about tracking authorized access events, then the authorization data elements 202a, 202b may be omitted. Or, in other implementations, the authorization data elements 202a, 202b may be stored using a standard memory, or a standard memory portion of the write-once memory 118.

The breach data element 204 is illustrated as a single data element and/or is associated with a single slot 208, based on the theory that a single unauthorized access event may be sufficient to cause the rejection, inspection, or replacement of the item 104b. However, in other example implementations, multiple breach data elements 204 (and associated slots) may be assigned.

For example, two such slots may be assigned, and multiple breach data elements may be stored corresponding to different unauthorized access events. Each such breach data element may store a time at which the corresponding unauthorized event occurred. Then, a recipient of the item 104b may investigate the first such breach and may determine that, in fact, the party accessing the container 102 at the indicated time was authorized to access the container 102, but failed to enter a correct authorization code, or the recipient may otherwise determine that the unauthorized access event was not sufficient to cause rejection or replacement of the item 104b. Nonetheless, if the unauthorized access event associated with the second breach data element remains unexplained, then the recipient may still reject or replace the item 104b.

As referenced above with regard to the authorization data elements 202a, 202b, it may be possible in some implementations to store the breach data element 204 in a memory or memory portion that is not write-once. In this case, the recipient should be aware that it is possible to write over the breach data element 204 and thereby hide or disguise the unauthorized access event (using, e.g., the tag writer 114 or another tag writer).

Figure 3:
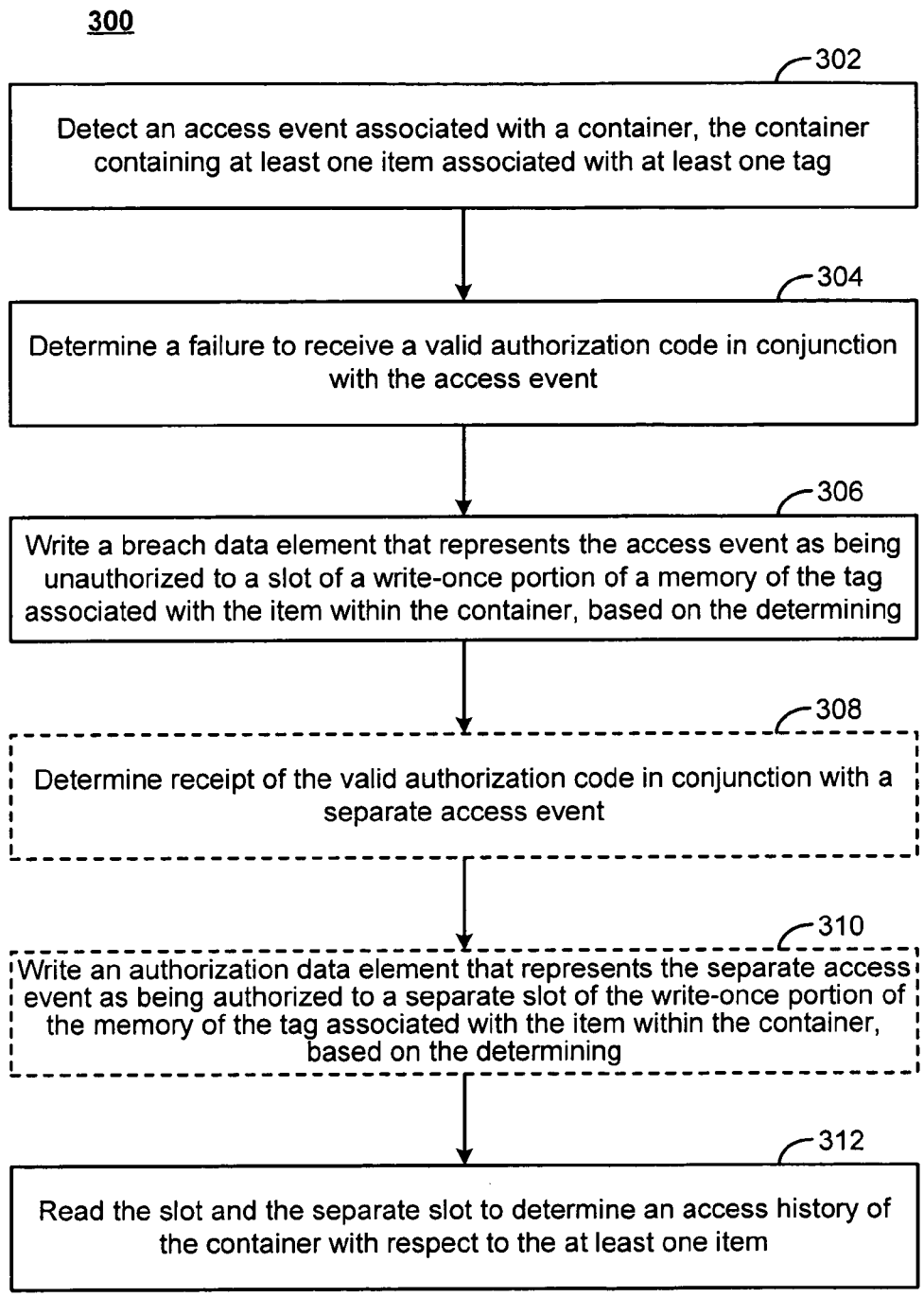
FIG. 3 is a flowchart illustrating example operations of the systems of FIGS. 1 and 2.

FIG. 3 is a flowchart 300 illustrating example operations of the systems of FIGS. 1 and 2. In FIG. 3, an access event associated with a container is detected, the container containing at least one item associated with at least one tag (302). For example, the access detector 120 may receive a notification from the sensors 112 of an opening of the access point 110 of the container 102, where, as already described, the container 102 contains the items 104a-104d, each attached to a corresponding tag 106a-106d.

A failure to receive a valid authorization code in conjunction with the access event may be determined (304). For example, the failure may include a determination of the access logic 122 that an authorization code received from the keypad 128 or the user device 132 in conjunction with the opening of the access point 110 is invalid, or the failure may include non-receipt of any authorization code. In either example, the access logic 122 may determine that the access event is unauthorized.

A breach data element that represents the access event as being unauthorized may be written to a slot of a write-once portion of a memory of the tag associated with the item within the container, based on the determining (306). For example, the access logic 122 may output a notification to the tag writer 114 that the access event, e.g., the opening of the access point 110, was unauthorized. Then, the tag writer 114 may write the breach data element 204 to the slot 208 of the write-once memory 118. As referenced above, and described in more detail below with respect to FIG. 4, this write operation may occur as an individual writing to an identified tag (e.g., the tag 106b), or may occur as a broadcast to all of the tags 106a-106d within the container 102.

In additional or alternative operations, receipt of the valid authorization code may be determined in conjunction with a separate access event (308). That is, although illustrated sequentially in the example of FIG. 3 as occurring after the unauthorized access event just described, it will be appreciated that, in fact, such an authorized access event (and corresponding receipt of the valid authorization code) may occur during a separate access event that may occur either before or after the unauthorized access event, or, of course, may occur in the absence of any unauthorized access event. Referring again to FIG. 1, the access logic 122 may receive the authorization code from the keypad 128 or the user device 132 in conjunction with the separate access event, and may determine that the authorization code is, in fact, valid.

An authorization data element that represents the separate access event as being authorized may be written to a separate slot of the write-once portion of the memory of the tag associated with the item within the container, based on the determining (310). For example, the access logic 122 may notify the tag writer 114 to write the authorization data element 202a to the slot 206a. As described herein, such a write operation may include information regarding a timing, type, or other characteristic of the access event.

Finally in the example of FIG. 3, the slot and the separate slot may be read to determine an access history of the container with respect to the at least one item (312). For example, the tag reader 116, or a separate tag reader of the recipient, may be used to read the slots 206a and 208, to thereby determine that, in this example, both an authorized and an unauthorized access event occurred with regard to the relevant item(s).

As will be appreciated, such an access history is independent of the container 102. For example, the item 104b may have been transported from a first location to a second location, and, at one or more stops along the way, may have been repackaged in a plurality of containers during the transportation. As long as each of the plurality of containers implements some variation of the system 100 (e.g., includes an electronic seal such as the electronic seal 108, and corresponding sensor(s) and tag writer(s)), then the recipient of the item 104b may have knowledge whether the item 104b was associated with an unauthorized access event at any time during its movement through the supply chain.

Figure 4:
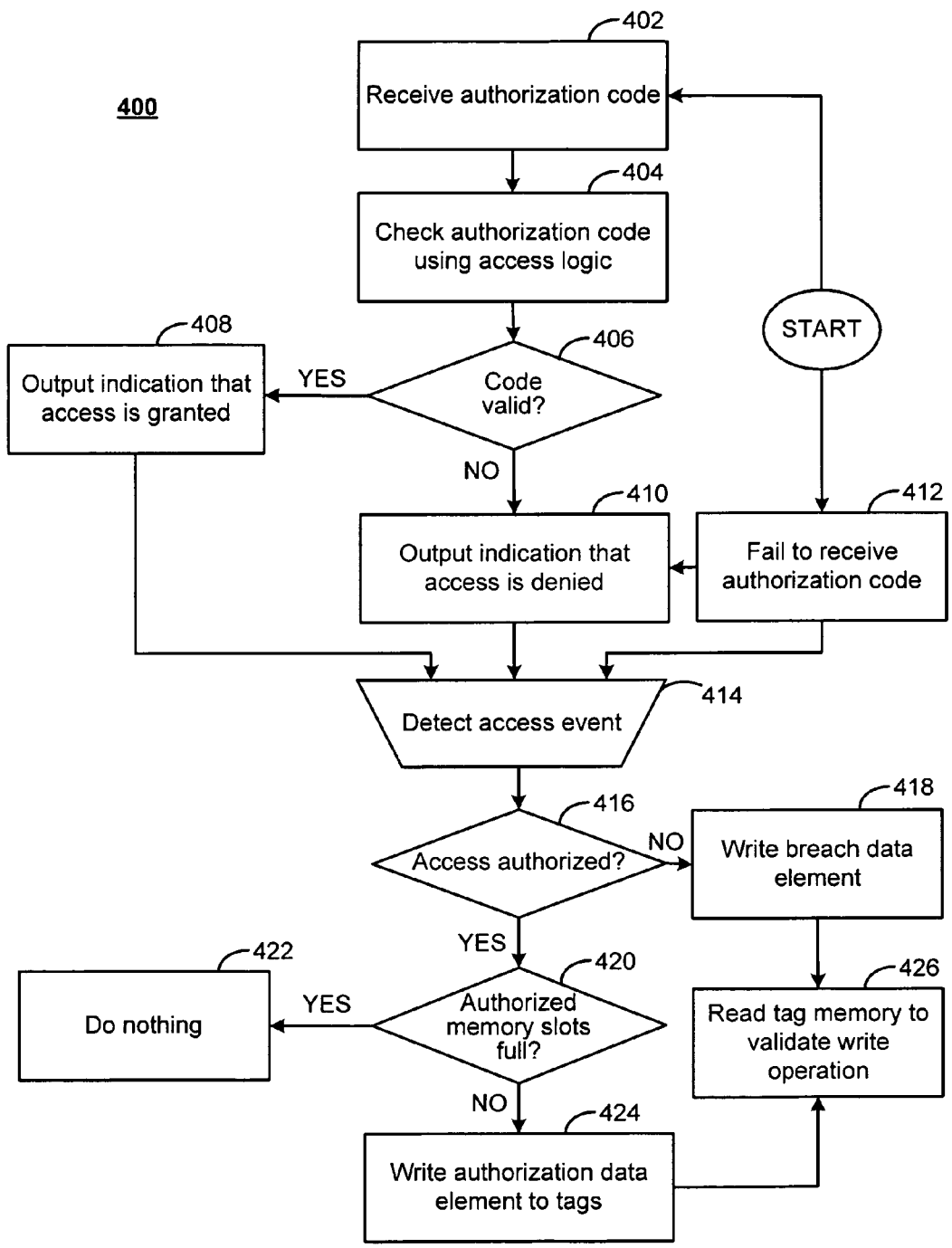
FIG. 4 is a flowchart illustrating additional example operations of the systems of FIGS. 1 and 2.

FIG. 4 is a flowchart 400 illustrating additional example operations of the systems of FIGS. 1 and 2. FIG. 4 encompasses a number of possible (authorized and unauthorized) access events. For example, the operations of FIG. 4 may begin with receipt of an authorization code (402), e.g., from the keypad 128 or the user device 132, and received at the interface 126 for validation by the access logic 122 (404).

If the authorization code is valid (406), then the status logic 124 may output an indication to the status display 130 or the user device 132 that access is granted (408). On the other hand, if the code is not valid (406), then the status logic 124 may output an indication that the access is denied (410).

Separately, e.g., before or after the receipt of the authorization code (402), it may occur that no authorization code is received (412). Whether a valid or invalid code is received, or whether no code is received, an access event may be detected (414), e.g., by the sensors 112 and the access detector 120.

If the access is not authorized (416), then the access logic 122 may instruct the tag writer 114 to write the breach data element 204 to the slot 208 of the write-once memory 118 (418). Although not illustrated specifically in FIG. 4, it will be appreciated from the above description that, prior to this write operation, a determination may first be made as to whether the breach data element 204 has already been written to one or more slot(s) 208 (e.g., the access logic 122 or the status logic 124 may instruct the tag reader 116 to read the slot 208). That is, for example, if the slot 208 is determined already to be full, the tag writer 114 may be instructed not to try to write to the slot 208, even if an unauthorized access event has been determined. If the tag writer 114 does attempt to write to an already-full slot 208, then the result may generally be a simple failure of the write process, due to the write-once nature of the write-once memory 118.

If the access is authorized (416), then the access logic 122 and/or the status logic 124 may determine whether memory slots for authorization data elements are full (420). For example, a number of available slots may be stored in the access events history 140, or in another memory of the electronic seal 108, and every time an authorized access event is detected and written, the memory may be updated. In this way, it may be determined whether authorized memory slots are available (420), so that, if not, then no action may need to be taken (422). If authorized memory slots are available (420), then the access logic 122 may instruct the tag writer 114 to write the authorization data element 202a to the slot 206a of the tag 106b (424).

It will be appreciated that virtually any read or write operation of the tag reader 116 or the tag writer 114 may be executed with respect to individual ones or groups of the items 104a-104d, or may be executed as a broadcast read/write operation that affects all of the items 104a-104d within the container 102. In the former case, for example, the access events history 140 or other memory of the electronic seal 108 may store address information for the tags 106a-106d, and/or may store criteria for the items 104a-104d as to whether and when to write the data element(s) to the tags 106a-106d. For example, the items 104a-104d may include some items that are not desired to be associated with item-level access tracking, and the electronic seal 108 (e.g., the access logic 122) may instruct the tag writer 114 to write to only the remaining ones of the items 104a-104d. In the latter case, in order to achieve the desired broadcasting, it will be appreciated that a layout of the items 104a-104d within the container 102, as well as a material or other characteristic of the items 104a-104d (or of the container 102) may be taken into account. For example, the antenna 117 may be unable to communicate with the tag 106d if the item 104d is stored underneath all of the items 104a-104c, or if one or more of the items 104a-104d contains a certain level of metal or water (which may reflect or absorb the RF signal(s), respectively).

After a write operation, whether the write operation reflects an authorized or unauthorized access event, the tag reader 116 may be used to execute a validation operation for the write operation (426). For example, the writing of the breach data element (418) may be executed as a broadcast operation to all of the tags 106a-106d. Then, the tag reader 116 may be used to read all of the tags 106a-106d, in order to ensure that, in fact, all of the tags 106a-106d reflect the executed write operation. In this way, the system 100 may guard against the issues mentioned above regarding whether a layout or material of the items 104a-104d have interfered with the write operation. Further, the system 100 may guard against the possibility that an unauthorized party accessing the container 102 has not attempted to jam, block, or otherwise thwart a transmitted signal of the tag writer 114 before or during the write operation. The validation information resulting from these read operations may be stored, e.g., as part of the access events history 140.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
   a plurality of electronic seals, each electronic seal associated with a container of a plurality of containers and configured to detect an access event associated with its respective container, and further configured to output a notification of the access event in response thereto;
   a plurality of tag writers, each tag writer contained within a container of the plurality of containers and configured to receive the notification of the access event and further configured, in response, to write a data element to a write-once memory of a corresponding tag that is attached to an item within the respective container, the data element signifying the access event; and
   at least one tag reader, the at least one tag reader configured to read the write-once memory of a currently-read tag attached to a currently-read item, the currently-read item and attached currently-read tag being included in a current container after having been re-packaged at least once from at least one previous container of the plurality of containers during a shipment of the currently-read item, and further configured to detect a recorded access event within the write-once memory and thereafter output an indication that the currently-read item was contained within a breached container during the shipment.

2. The system of claim 1 wherein each electronic seal is configured to detect the access event based on a signal received from one or more sensors deployed at an access point of the corresponding container.

3. The system of claim 1 wherein each electronic seal comprises:
an interface configured to receive an authorization code in association with the access event; and
access logic configured to determine a receipt and/or validity of the authorization code.

4. The system of claim 1 wherein each electronic seal comprises status logic configured to provide a current status of the access event as authorized or unauthorized to a display.

5. The system of claim 1 wherein each tag writer is configured to receive, from the electronic seal and in conjunction with the notification of the access event, a notification of authorization to access the container, and further wherein each tag writer is configured to write the notification of authorization to the corresponding write-once memory as an authorization data element in association with the data element.

6. The system of claim 1 wherein each tag writer is configured to receive, from the corresponding electronic seal and in conjunction with the notification of the access event, a notification of non-authorization to access the corresponding container, and further wherein each tag writer is configured to write the notification of non-authorization to the corresponding write-once memory as a breach data element in association with the data element.

7. The system of claim 1 wherein each tag writer is configured to write the data element signifying the notification of the access event to each of a plurality of tags that are respectively associated with a plurality of items within the corresponding container, based on corresponding unique identifiers of the tags.

8. The system of claim 1 wherein each tag writer is configured to broadcast the data element signifying the notification of the access event to all of a plurality of tags that are respectively associated with a plurality of items within each container, including the tag and the item.

9. The system of claim 1 wherein each tag writer is configured to write information regarding a timing and/or type of the access event to the corresponding write-once memory in association with the data element.

10. The system of claim 1 comprising:
a tag reader within each container of the plurality of containers and configured to read the write-once memory and validate the writing of the data element to the write-once memory.

11. The system of claim 10 wherein each electronic seal is configured to receive the report of the corresponding tag reader and is configured to store the report including an identifier of the tag and/or the item.

12. The system of claim 1 wherein the tag includes a Radio Frequency Identifier (RFID) tag.

13. A method comprising:
reading, using a tag reader, a write-once portion of a memory of a tag attached to an item, the item and attached tag being included in a container after having been re-packaged at least once from at least one previous container during a shipment of the item;
detecting an access event associated with the tag, based on the reading of the write-once portion; and
outputting an indication that the item was contained within a breached container during the shipment, based on the detecting.

14. The method of claim 13, wherein reading the write-once portion of the memory of the tag including reading a second portion of the memory to determine an access history of the container and of the at least one previous container during the shipment.

15. The method of claim 13, wherein the tag includes a Radio Frequency Identifier (RFID) tag.

16. The method of claim 13, wherein the outputting the indication includes displaying the indication using the tag reader.

17. A computer program product including instructions stored on non-transitory computer-readable storage media, which, when executed by at least one processor, cause the at least one processor to:
cause a plurality of electronic seals, each electronic seal associated with a container of a plurality of containers, to detect an access event associated with its respective container, and to output a notification of the access event in response thereto;
cause a plurality of tag writers, each tag writer contained within a container of the plurality of containers, to receive the notification of the access event and, in response, to write a data element to a write-once memory of a corresponding tag that is attached to an item within the respective container, the data element signifying the access event; and
cause at least one tag reader to read the write-once memory of a currently-read tag attached to a currently-read item, the currently-read item and attached currently-read tag being included in a current container after having been re-packaged at least once from at least one previous container of the plurality of containers during a shipment of the currently-read item, and to detect a recorded access event within the write-once memory and thereafter output an indication that the currently-read item was contained within a breached container during the shipment.

18. The computer program product of claim 17 wherein the instructions, when executed by the at least one processor, cause the at least one processor to cause each electronic seal to detect the access event based on a signal received from one or more sensors deployed at an access point of the corresponding container.

19. The computer program product of claim 17 wherein each electronic seal comprises:
an interface configured to receive an authorization code in association with the access event; and
access logic configured to determine a receipt and/or validity of the authorization code.

20. The system of claim 17 wherein each electronic seal comprises status logic configured to provide a current status of the access event as authorized or unauthorized to a display.

* * * * *